United States Patent
Morita et al.

(10) Patent No.: US 9,235,094 B2
(45) Date of Patent: Jan. 12, 2016

(54) LIQUID CRYSTAL DISPLAY DEVICE

(71) Applicant: Japan Display Inc., Minato-ku (JP)

(72) Inventors: Yusuke Morita, Saitama-ken (JP); Jin Hirosawa, Saitama-ken (JP); Arihiro Takeda, Saitama-ken (JP); Nobuko Fukuoka, Saitama-ken (JP); Keiji Tago, Saitama-ken (JP); Kazuya Daishi, Saitama-ken (JP)

(73) Assignee: JAPAN DISPLAY INC., Minato-ku (JP)

( * ) Notice: Subject to any disclaimer, the term of this patent is extended or adjusted under 35 U.S.C. 154(b) by 0 days.

(21) Appl. No.: 14/507,442

(22) Filed: Oct. 6, 2014

(65) Prior Publication Data

US 2015/0022769 A1    Jan. 22, 2015

Related U.S. Application Data

(62) Division of application No. 13/348,906, filed on Jan. 12, 2012, now Pat. No. 8,885,132.

(30) Foreign Application Priority Data

Mar. 17, 2011  (JP) .................. 2011-059762

(51) Int. Cl.
*G02F 1/1337*    (2006.01)
*G02F 1/1343*    (2006.01)
(Continued)

(52) U.S. Cl.
CPC ........ *G02F 1/136286* (2013.01); *G02F 1/1336* (2013.01); *G02F 1/1337* (2013.01);
(Continued)

(58) Field of Classification Search
CPC .............. G02F 1/134309; G02F 2001/133738; G02F 2001/134318

USPC .......................................... 349/129, 139, 146
See application file for complete search history.

(56) References Cited

U.S. PATENT DOCUMENTS

| 6,266,116 B1 | 7/2001 | Ohta et al. |
| 2001/0010575 A1 | 8/2001 | Yoshida et al. |

(Continued)

FOREIGN PATENT DOCUMENTS

| JP | 6-222397 | 8/1994 |
| JP | 7-159807 | 6/1995 |

(Continued)

OTHER PUBLICATIONS

U.S. Appl. No. 14/482,802, filed Sep. 10, 2014, Hirosawa, et al.

(Continued)

*Primary Examiner* — Nathanael R Briggs
(74) *Attorney, Agent, or Firm* — Oblon, McClelland, Maier & Neustadt, L.L.P.

(57) ABSTRACT

In one embodiment, a liquid crystal display device comprises a pixel electrode including a first main electrode disposed between a first line and a second line and extending like a belt in a first extending direction. A first counter electrode includes a second main electrode extending like a belt in the first extending direction, a second counter electrode having a third main electrode extending like a belt in the first extending direction. The second and third main electrodes are disposed on both sides of the first main electrode, and an initial alignment direction of the liquid crystal molecules is parallel with a direction passing through an interstice between the first end side of the first main electrode and the second line, and through an interstice between the second end side of the first main electrode and the first line.

3 Claims, 9 Drawing Sheets

(51) Int. Cl.
*G02F 1/1362* (2006.01)
*G02F 1/1335* (2006.01)
*G02F 1/1368* (2006.01)

(52) U.S. Cl.
CPC ........ *G02F1/1368* (2013.01); *G02F 1/134309* (2013.01); *G02F 1/134336* (2013.01); *G02F 2001/133738* (2013.01); *G02F 2001/134318* (2013.01)

(56) References Cited

U.S. PATENT DOCUMENTS

| | | |
|---|---|---|
| 2004/0165136 A1 | 8/2004 | Sugiyama et al. |
| 2005/0088582 A1 | 4/2005 | Park et al. |
| 2005/0206824 A1 | 9/2005 | Son et al. |
| 2005/0219453 A1 | 10/2005 | Kubo et al. |
| 2007/0030428 A1 | 2/2007 | Lu et al. |
| 2007/0115234 A1 | 5/2007 | Kim et al. |
| 2008/0062358 A1 | 3/2008 | Lee et al. |
| 2008/0180590 A1* | 7/2008 | Lee .................. G02F 1/136286 349/39 |
| 2008/0180623 A1 | 7/2008 | Lee et al. |
| 2008/0186439 A1 | 8/2008 | Kwon et al. |
| 2011/0234947 A1 | 9/2011 | Hirosawa |
| 2012/0099070 A1 | 4/2012 | Hirosawa et al. |

FOREIGN PATENT DOCUMENTS

| | | |
|---|---|---|
| JP | 9-105908 A | 4/1997 |
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 11-125835 | 5/1999 |
| JP | 2000-19558 A | 1/2000 |
| JP | 2000-330123 A | 11/2000 |
| JP | 2002-40456 A | 2/2002 |
| JP | 2003-322869 | 11/2003 |
| JP | 2005-3802 | 1/2005 |
| JP | 3644653 | 2/2005 |
| JP | 2005-242307 | 9/2005 |
| JP | 2009-192822 | 8/2009 |
| JP | 2009-192822 A | 8/2009 |
| JP | 2010-26287 A | 2/2010 |
| WO | WO 2005/071477 | 8/2005 |

OTHER PUBLICATIONS

U.S. Appl. No. 14/750,484, filed Jun. 25, 2015, Hirosawa.
Office Action issued Oct. 15, 2013 in Japanese Patent Application No. 2011-059762 (with English Translation).
Office Action issued Jul. 8, 2014 in Japanese Patent Application No. 2011-059762 (with English Translation).

* cited by examiner

LIQUID CRYSTAL DISPLAY DEVICE

CROSS-REFERENCE TO RELATED APPLICATION

This application is a divisional of U.S. application Ser. No. 13/348,906 filed Jan. 12, 2012, and is based upon and claims the benefit of priority from prior Japanese Patent Application No. 2011-059762, filed Mar. 17, 2011, the entire contents of each of which are incorporated herein by reference.

FIELD

Embodiments described herein relate generally to a liquid crystal display device.

BACKGROUND

Recently, flat display devices have been actively developed. Among others, liquid crystal display devices have attracted an attention due to their advantages such as lightness, thinness, and low power consumption. In particular, noteworthy configurations for an active matrix type liquid crystal display device incorporating a switching element in each pixel are those using a lateral electric field (including a fringe electric field) such as an IPS (In-Plane Switching) mode and FFS (Fringe Field Switching) mode. The liquid crystal display device in the lateral electric field mode includes pixel electrodes and counter electrodes formed in an array substrate, and performs switching of liquid crystal molecules using the lateral electric filed substantially parallel with a principal surface of the array substrate.

On the other hand, there has been also proposed a technique of performing switching of the liquid crystal molecules by forming a lateral electric field or an oblique electric field between the pixel electrode formed on the array substrate and the counter electrode.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

Figure 1:
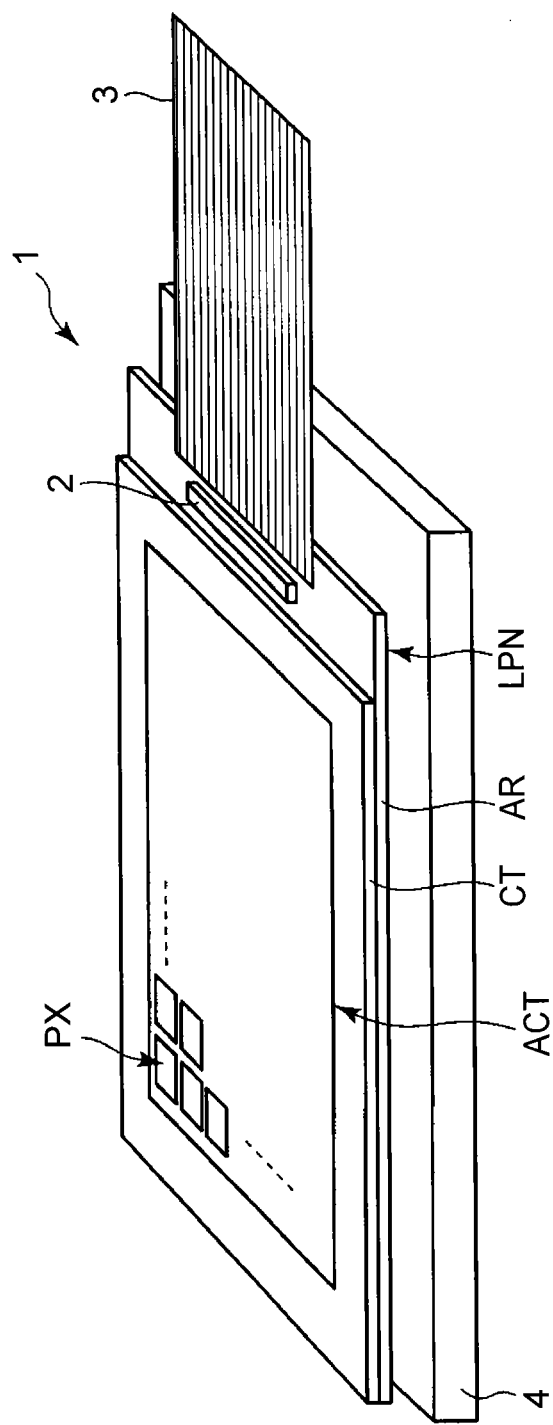
FIG. 1 is a view schematically showing a configuration of a liquid crystal display device according to an embodiment.

A liquid crystal display device according to an exemplary embodiment of the present invention will now be described with reference to the accompanying drawings wherein the same or like reference numerals designate the same or corresponding parts throughout the several views.

According to one embodiment, a liquid crystal display device includes: a first substrate including a first line and a second line which extend in directions parallel with each other, a pixel electrode including a first main electrode disposed between the first line and the second line and extending like a belt in a first extending direction, a first auxiliary electrode extending from a first end side of the first main electrode toward the first line, and a second auxiliary electrode extending from a second end side of the first main electrode toward the second line, and a first alignment layer covering the pixel electrode; a second substrate including a first counter electrode including a second main electrode extending like a belt in the first extending direction, a second counter electrode including a third main electrode extending like a belt in the first extending direction, and a second alignment layer covering the first counter electrode and the second counter electrode; and a liquid crystal layer including liquid crystal molecules held between the first substrate and the second substrate, wherein the second main electrode and the third main electrode are disposed on both sides of the first main electrode and an initial alignment direction of the liquid crystal molecules is parallel with a direction passing through an interstice between the first end side of the first main electrode and the second line and through an interstice between the second end side of the first main electrode and the first line.

According to other embodiment, a liquid crystal display device includes: a first substrate including a pixel electrode having a first main electrode extending like a belt in a first extending direction, a first auxiliary electrode extending from a first end side of the first main electrode in a direction different from the first extending direction, and a second auxiliary electrode extending from a second end side of the first main electrode in a direction different from the first extending direction, and a first alignment layer covering the pixel electrode; a second substrate including a first counter electrode having a second main electrode extending like a belt in the first extending direction, a second counter electrode having a third main electrode extending like a belt in the first extending direction, and a second alignment layer covering the first counter electrode and the second counter electrode; and a liquid crystal layer including liquid crystal molecules held between the first substrate and the second substrate, wherein the second main electrode and the third main electrode are disposed on both sides of the first main electrode, and the first auxiliary electrode and the second auxiliary electrode are each disposed in an area where an angle between a reference straight line which is parallel with an initial alignment direction of the liquid crystal molecules and passes through the center of the first main electrode and the center line which is parallel with the first extending direction and passes the center of the first main electrode is an obtuse angle.

According to other embodiment, a liquid crystal display device includes: a first substrate including a first line and a second line extending in directions parallel with each other, a pixel electrode including a first main electrode disposed between the first line and the second line and extending like a belt in a first extending direction, a second main electrode extending like a belt in a second extending direction different from the first extending direction and connected with the first main electrode, a first auxiliary electrode extending from a second end side of the first main electrode toward the second line, a second auxiliary electrode extending from a connected portion of the first main electrode with the second main electrode toward the first line, and a third auxiliary electrode extending from a second end side of the second main electrode toward the second line, and a first alignment layer covering the pixel electrode; a second substrate including a first counter electrode having a third main electrode extending like a belt in the first extending direction and a fourth main electrode extending like a belt in the second extending direction and connected with the third main electrode, a second counter electrode having a fifth main electrode extending like a belt in the first extending direction and a sixth main electrode extending like a belt in the second extending direction and connected with the fifth main electrode, and a second alignment layer covering the first counter electrode and the second counter electrode; and a liquid crystal layer including liquid crystal molecules held between the first substrate and the second substrate, wherein the third main electrode and the fifth main electrode are disposed on both sides of the first main electrode, the fourth main electrode and the sixth main electrode are disposed on both sides of the second main electrode, and an initial alignment direction of the liquid crystal molecules is parallel with a direction passing through an interstice between the second end side of the first main electrode and the first line and an interstice between the second end side of the second main electrode and the first line.

FIG. 1 is a view schematically showing a configuration of a liquid crystal display device 1 according to this embodiment. The liquid crystal display device 1 includes an active matrix-type liquid crystal display panel LPN, a drive IC chip 2 which is connected with the liquid crystal display panel LPN, a flexible wiring substrate 3, a back light 4 to illuminate the liquid crystal display panel LPN, and the like.

The liquid crystal display panel LPN is configured of an array substrate AR which is a first substrate, a counter substrate CT which is a second substrate disposed opposite to the array substrate AR, and an unillustrated liquid crystal layer which is held between the array substrate AR and the counter substrate CT. Such liquid crystal display panel LPN includes an active area ACT to display an image. This active area ACT includes a plurality of pixels PX which are disposed in a matrix form with m×n pixels (here, m and n are positive integers).

In the illustrated example, the back light 4 is disposed on a back surface side of the array substrate AR. As such back light 4, a various forms can be applied, and the back light 4 may be any of one using a light emitting diode (LED) used as a light source or one using a cold-cathode tube (CCFL). The detailed description of the configuration thereof will be omitted.

Figure 2:
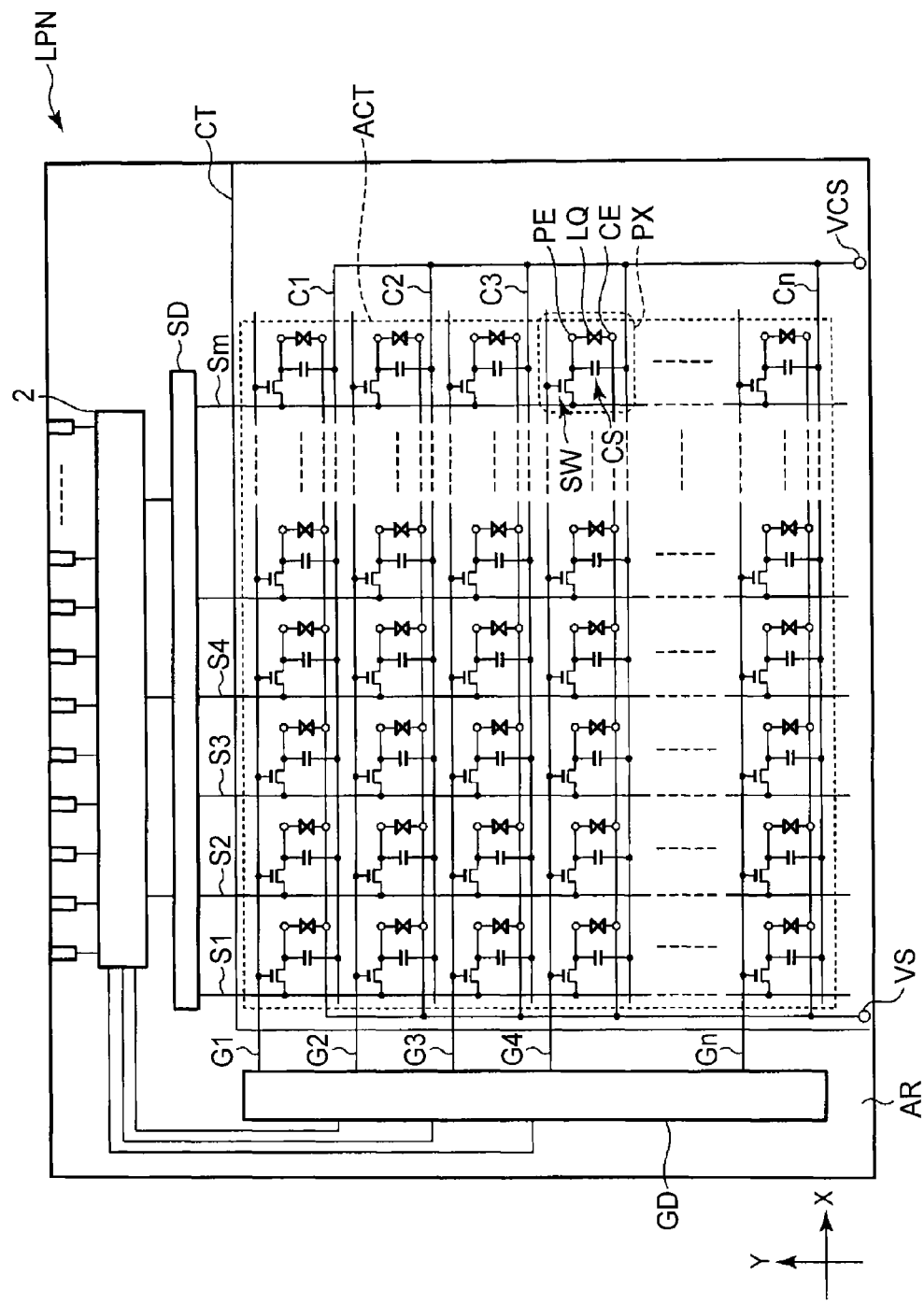
FIG. 2 is a view schematically showing the configuration and equivalent circuit of a liquid crystal display panel shown in FIG. 1.

FIG. 2 is a view schematically showing the configuration and equivalent circuit of the liquid crystal display panel LPN shown in FIG. 1.

The liquid crystal display panel LPN includes, in the active area ACT, n gate lines G (G1 to Gn), n auxiliary capacitance lines C (C1 to Cn), m source lines S (S1 to Sm), and the like. The gate lines G and the auxiliary capacitance lines C extend in a first direction X. Also, the gate lines G and the auxiliary capacitance lines C are alternately arranged in parallel in a second direction Y perpendicular to the first direction X. Each source line S extends in the second direction Y where the gate line G and the auxiliary capacitance line C intersect each other. Also, the source lines S are disposed in parallel in the first direction X. In the illustrated example, the gate line G and the auxiliary capacitance line C, and the source line S are substantially perpendicular to one another. Note that the source line S is not limited to linearly extend but may be curved in at least one portion thereof.

Each gate line G is pulled out to the outside of the active area ACT and is connected with a gate driver GD. Each source line S is pulled out to the outside of the active area ACT and is connected with a source driver SD. At least one portion of these gate driver GD and source driver SD is formed on the array substrate, for example, and is connected with the drive IC chip 2 having a built-in controller.

Each pixel PX includes a switching element SW, a pixel electrode PE, a counter electrode CE, and the like. A retentive capacitance Cs is formed between the auxiliary capacitance line C and the pixel electrode PE, for example.

According to the embodiment, the liquid crystal display panel LPN has a configuration in which the pixel electrode PE is formed on the array substrate AR while the counter electrode CE is formed on the counter substrate CT, and mainly uses an electric field formed between the pixel electrode PE and the counter electrode CE to switch liquid crystal molecules of the liquid crystal layer LQ. The electric field formed between the pixel electrode PE and the counter electrode CE is a lateral electric filed (or an oblique electric filed slightly oblique with respect to the substrate surface) substantially parallel with the principal surface of the array substrate AR or the principal surface of the counter substrate CT.

The switching element SW is formed of, for example, an n-channel thin film transistor (FTF). This switching element SW is electrically connected to the gate line G and the source line S. In the active area ACT, m×n switching elements SW are formed.

The pixel electrode PE is electrically connected to the switching element SW. In the active area ACT, m×n pixel electrodes PE are formed. The counter electrode CE has, for example, a common potential and is commonly disposed via the liquid crystal layer LQ to the plurality of pixel electrodes PE. This counter electrode CE is electrically connected to a voltage supplying portion VS formed on the array substrate AR via an unillustrated conductive member. The auxiliary capacitance line C is electrically connected to a voltage applying portion VCS to which an auxiliary capacitance voltage is applied.

Hereinafter, the first configuration example according to the embodiment is described.

Figure 3:
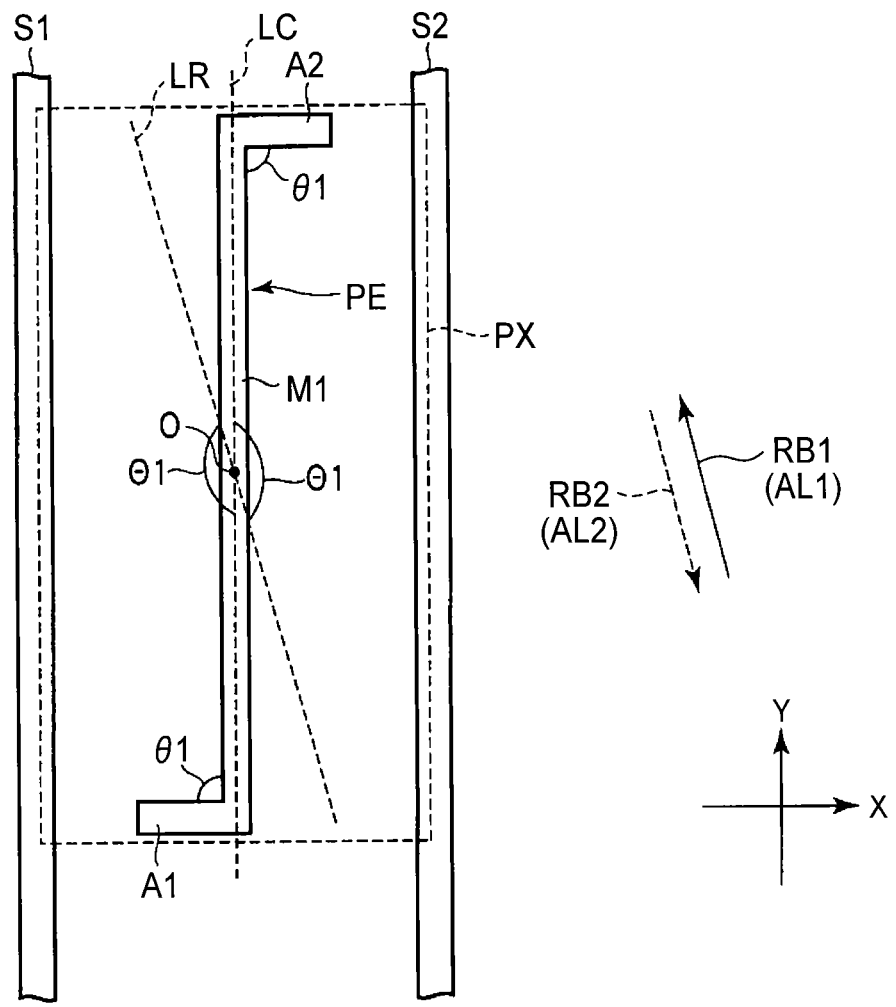
FIG. 3 is a plan view schematically showing a configuration of an array substrate when one pixel of the liquid crystal display panel shown in FIG. 2 is seen from a counter substrate side.

FIG. 3 is a plan view schematically showing a structure of the array substrate AR when one pixel PX of the liquid crystal display panel LPN shown in FIG. 2 is seen from a counter substrate CT side. Note that in the figure, only one pixel PX configuring the active area ACT is shown, but other pixels also have the same configuration. Also, the illustrated example illustrates only the constituents needed for description of one pixel.

A source line S1 and a source line S2 are parallel with each other and both of which outwardly extend in the second direction Y. The pixel electrode PE is disposed between the source line S1 and the source line S2. In the illustrated example, the pixel PX corresponds to a region shown by the broken line in the figure and has a rectangular shape whose length in the second direction Y is longer than the length in the first direction X. Also, in the illustrated example, the source line S1 is disposed at the left end portion, and the source line S2 is disposed at the right end portion with respect to the pixel PX. A substantially rectangular aperture is formed between the source line S1 and the pixel electrode PE and between the source line S2 and the pixel electrode PE.

The pixel electrode PE is electrically connected to a switching element which is not illustrated. The pixel electrode PE includes a first main electrode M1, a first auxiliary electrode A1, and a second auxiliary electrode A2. These first main electrode M1, first auxiliary electrode A1, and second auxiliary electrode A2 are integrally formed and are electrically connected to one another. Also, the pixel electrode PE may further include a capacitance portion forming an auxiliary capacitance with the auxiliary capacitance line, a connection portion to be electrically connected to the switching element, a secondary electrode which is aligned on the gate line to weaken influence of an electric field from the gate line, and the like.

The first main electrode M1 extends like a belt in the second direction Y and is linearly formed. Here, a first extending direction in which the first main electrode M1 extends is equivalent to the second direction Y. This first main electrode M1 is positioned on an inner side of each of the source line S1 and the source line S2 in the pixel PX and is positioned almost in the middle between the source line S1 and the source line S2.

The first main electrode M1 extends from an upper end portion to a lower end portion in the pixel PX. Here, a portion of the first main electrode M1 between the lower end portion of the pixel PX and the center "O" of the first main electrode M1, is referred to as a first end side of the first main electrode M1 and a portion between the upper end portion side of the pixel PX and the center "O" of the first main electrode M1 is referred to as a second end side of the first main electrode M1.

The first auxiliary electrode A1 extends from a first end side of the first main electrode M1 in a direction different from the second direction Y which is the first extending direction and is linearly formed. Here, the first auxiliary electrode A1 extends from the first main electrode M1 to the left thereof. In other words, the first auxiliary electrode A1 extends from the first end side of the first main electrode M1 to the source line S1.

The second auxiliary electrode A2 extends from the second end side of the first main electrode M1 in a direction different from the second direction Y which is the first extending direction and is linearly formed. Here, the second auxiliary electrode A2 extends from the first main electrode M1 to the right thereof. In other words, the second auxiliary electrode A2 extends from the second end side of the first main electrode M1 to the source line S2.

In the example shown here, the first auxiliary electrode A1 is connected with a lower end portion (first end portion) of the first main electrode M1. The second auxiliary electrode A2 is connected with an upper end portion (second end portion) of the first main electrode M1. The direction in which the first auxiliary electrode A1 extends is parallel with the direction in which the second auxiliary electrode A2 extends. A second extending direction in which these first auxiliary electrode A1 and second auxiliary electrode A2 extend is parallel with the first direction X, for example. In other words, in the example shown here, the first auxiliary electrode A1 and the second auxiliary electrode A2 are substantially perpendicular to the first main electrode M1. Note that, an angle between the first extending direction and the second extending direction, i.e., an angle shown by θ1 in the figure between the first main electrode M1 and the first auxiliary electrode A1 or between the first main electrode M1 and the second auxiliary electrode A2 is not limited to 90° but it is preferably needed that the angle be equal or larger than 90° and smaller than 180°.

The first auxiliary electrode A1 is set to have such length as not to reach the source line S1. Similarly, the second auxiliary electrode A2 is set to have such length as not to reach the source line S2.

An auxiliary electrode extending from the first end side of the first main electrode M1 to the source line S2 or an auxiliary electrode extending from the second end side of the first main electrode M1 to the source line S1 is not provided. Accordingly, these first main electrode M1, first auxiliary electrode A1, and second auxiliary electrode A2 form a substantially S-letter shape or a reverse S-letter shape.

With respect to the pixel configuration as described above, alignment processes for initially aligning liquid crystal molecules (e.g., a rubbing process or a photo-aligning process) is performed on a first alignment layer AL1 disposed on the surface of the array substrate AR to cover the pixel electrode PE and a second alignment layer AL2 disposed on the surface of a counter substrate to cover the counter electrode. A first alignment process direction RB 1 in which the first alignment layer AL1 initially aligns liquid crystal molecules and a second alignment process direction RB 2 in which the second alignment layer AL2 initially aligns the liquid crystal molecules are set in directions shown in the figure. These first alignment process direction RB1 and second alignment process direction RB2 are parallel with each other. In the example shown here, the first alignment process direction RB1 and the second alignment process direction RB2 are reverse to each other but may have a same direction.

Here, the first alignment process direction RB1 and the second alignment process direction RB2 are parallel with a reference straight line LR passing through an interstice between the first end side of the first main electrode M1 and the source line S2 which is the second line and through an interstice between the second end side of the first main electrode M1 and the source line S1 which is the first line. In other words, in the example shown here, the first alignment process direction RB1 and the second alignment process direction RB2 each are a direction intersecting, at a sharp angle in the counterclockwise direction with respect to the second direction Y which is the first extending direction.

An area where the first auxiliary electrode A1 and the second auxiliary electrode A2 are disposed and the first alignment process direction RB1 and the second alignment process direction RB2 have a following relationship. That is to say, the first alignment process direction RB1 and the second alignment process direction RB2 have a direction parallel with an initial alignment direction of liquid crystal molecules to be described later. The first auxiliary electrode A1 and the second auxiliary electrode A2 are disposed in the area in which an angle θ1 between the reference straight line LR which is parallel with the initial alignment direction of the crystal liquid molecules and passes the center "O" of the first main electrode M1 and the center line LC which is parallel with the first extending direction and passes the center "O" of the first main electrode M1 is an obtuse angle.

Figure 4:
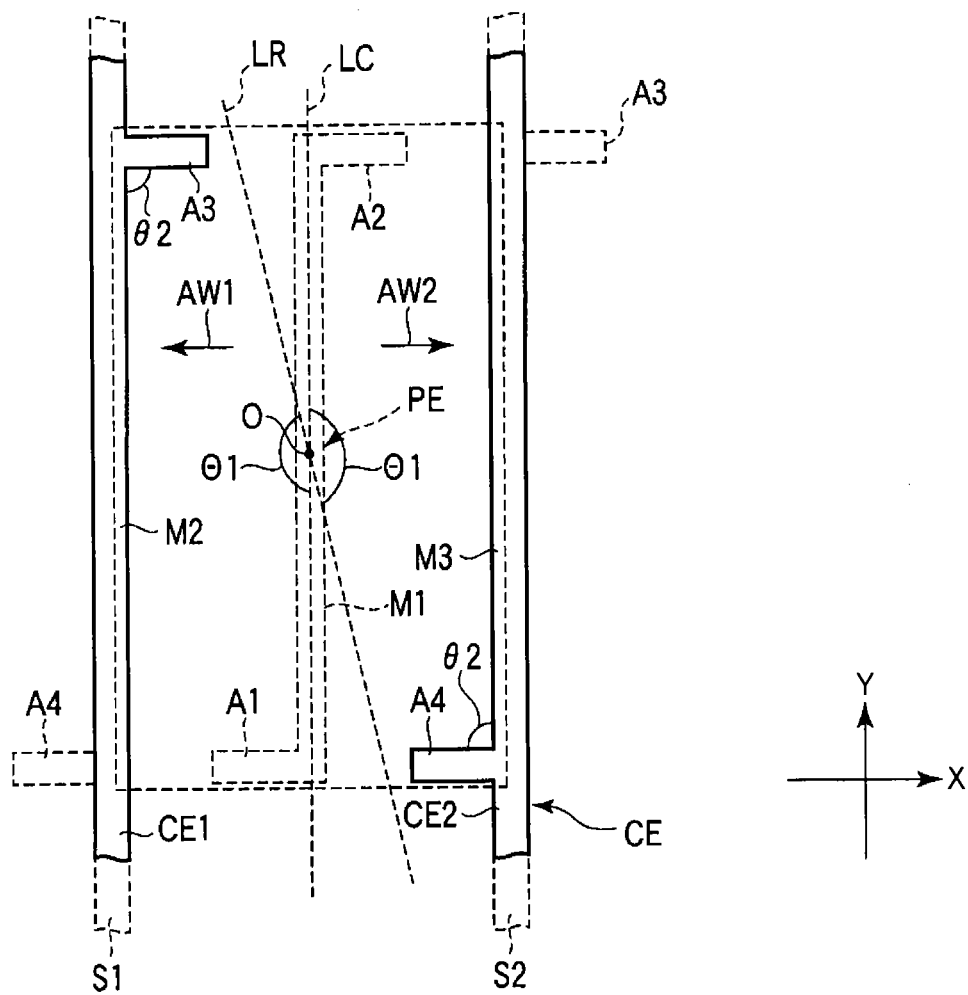
FIG. 4 is a plan view schematically showing a configuration of one pixel on the counter substrate of the liquid crystal display panel shown in FIG. 2.

FIG. 4 is a plan view schematically showing the structure of one pixel PX in the counter substrate CT of the liquid crystal display panel LPN shown in FIG. 2. Note that the pixel electrode PE and source lines S1 and S2 of the one pixel PX are shown by the broken line for illustrating a positional relationship between the counter electrode CE and the pixel electrode PE.

The counter electrode CE includes the illustrated first counter electrode CE1 and second counter electrode CE2. In other words, these first counter electrode CE1 and second counter electrode CE2 are electrically connected to each other. The first counter electrode CE1 includes a second main electrode M2 and a third auxiliary electrode A3 corresponding to the one pixel PX. The second counter electrode CE2 includes a third main electrode M3 and a fourth auxiliary electrode A4 corresponding to the one pixel PX.

The second main electrode M2 and the third main electrode M3 extend like a belt in the first extending direction (the second direction Y) parallel with the extending direction of the first main electrode M1 and are linearly formed. In other words, these second main electrode M2 and third main electrode M3 are parallel with the first main electrode M1.

The second main electrode M2 faces the source line S1. Here, the second main electrode M2 is disposed right above the source line S1. In other words, the second main electrode M2 is disposed between the pixel PX and a pixel (not shown) adjacent to the left side thereof.

In addition, the third main electrode M3 faces the source line S2. Here, the third main electrode M3 is disposed right above the source line S2. In other words, the third main electrode M3 is disposed between the pixel PX and a pixel (not shown) adjacent to the right side thereof.

These second main electrode M2 and third main electrode M3 are alternately arranged at a substantially regular interval in the first direction X without overlapping with the first main electrode of the pixel electrode PE. In other words, the second main electrode M2 is arranged beside a position right above the first main electrode M1 (without overlapping), while the third main electrode M3 is disposed opposite to the second main electrode M2 across the position right above the first main electrode M1.

The first electrode M1 is positioned almost in the middle between the second main electrode M2 and the third main electrode M3. The second main electrode M2, the first main electrode M1, and the third main electrode M3 are sequentially arranged in this order from the left to the right in the figure. Here, an electrode-to-electrode distance in the first direction X between the first main electrode M1 and the second main electrode M2 is substantially same as an electrode-to-electrode distance in the first direction X between the first main electrode M1 and the third main electrode M3.

The third auxiliary electrode A3 of the first counter electrode CE1 extends in a direction different from the second direction Y which is the first extending direction. In other words, the third auxiliary electrode A3 extends from a position in the second main electrode M2, which is lined up with the second end side of the first main electrode M1, toward the second counter electrode CE2 and is linearly formed. Here, the third auxiliary electrode A3 extends from the second main electrode M2 to the right side thereof.

The fourth auxiliary electrode A4 of the second counter electrode CE2 extends in the direction different from the second direction Y which is the first extending direction. In other words, the fourth auxiliary electrode A4 extends from a position in the third main auxiliary electrode M3, which is lined up with the first end side of the first main electrode M1 toward the first counter electrode CE1 and is linearly formed. Here, the fourth auxiliary electrode A4 extends from the third main electrode M3 to the left side thereof.

The direction in which the third auxiliary electrode A3 extends is parallel with the direction in which the fourth auxiliary electrode A4 extends but the directions are reverse directions with respect to each other. A third extending direction in which these third auxiliary electrode A3 and fourth auxiliary electrode A4 extend is parallel with the first direction X, for example. Also, the second extending direction in which the first auxiliary electrode A1 and second auxiliary electrode A2 extend is parallel with the third extending direction in which the third auxiliary electrode A3 and the fourth auxiliary electrode A4 extend.

As shown in the figure, the third auxiliary electrode A3 extends in a direction same as that of the second auxiliary electrode A2 (both in the direction to the right). Also, the fourth auxiliary electrode A4 extends in a direction same as that of the first auxiliary electrode A1 (both in the direction to the left). In the illustrated example, the third auxiliary electrode A3 is formed so as to be positioned in a substantially same straight line with the second auxiliary electrode A2, and the fourth auxiliary electrode A4 is formed so as to be substantially same straight line with the first auxiliary electrode A1.

In the example shown here, the third auxiliary electrode A3 is perpendicular to the second main electrode M2, and the fourth auxiliary electrode A4 is perpendicular to the third main electrode M3. Note that, an angle between the first extending direction and the third extending direction, i.e., an angle shown by θ2 in the figure between the second main electrode M2 and the third auxiliary electrode A3, and an angle between the third main electrode M3 and the fourth auxiliary electrode A4 is not limited to 90° but it is preferably needed that the angle be equal to or larger than 90° and smaller than 180°.

These third auxiliary electrode A3 and fourth auxiliary electrode A4 are set to have such length as not to reach the position right above the pixel electrode PE.

Note that the first counter electrode CE1 includes the fourth auxiliary electrode (shown by the broken line in the figure) corresponding to a pixel adjacent to the left side of the pixel PX. Also, the second counter electrode CE2 includes the third auxiliary electrode (A3 shown by the broken line in the figure) corresponding to a pixel adjacent to the right side of the pixel PX.

In the pixel PX having the above-described configuration, apertures (a transmissive portion) which mainly contribute to display are formed between the first main electrode M1 and the second main electrode M2 and between the first main electrode M1 and the third main electrode M3. In a state where an electric field is formed between the pixel electrode PE and the counter electrode CE, a main alignment direction of the liquid crystal molecules LM in each aperture is shown by any of arrows AW1 and AW2 in the figure. In other words, the alignment is made in two directions in the one pixel PX.

Figure 5:
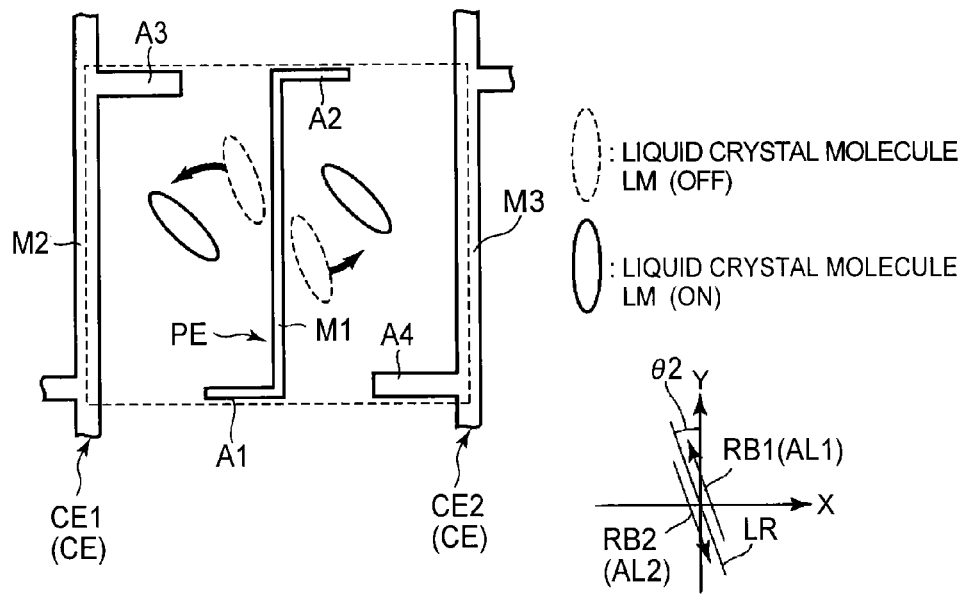
FIG. 5 is a plan view schematically showing a minimum unit constituent in one pixel of a first configuration example.

FIG. 5 is a plan view schematically showing a minimum unit constituent in the one pixel PX of the first configuration example.

The pixel electrode PE includes the first main electrode M1, the first auxiliary electrode A1, and the second auxiliary electrode A2. The first counter electrode CE1 includes the second main electrode M2 and the third auxiliary electrode A3. The second counter electrode CE2 includes the third main electrode M3 and the fourth auxiliary electrode A4.

The first alignment process direction RB1 of the first alignment layer AL1 which covers the pixel electrode PE and the second alignment process direction RB2 of the second alignment layer AL2 which covers the counter electrode CE are parallel with each other and are parallel with the reference straight line LR intersecting the second direction Y at a sharp angle in the counterclockwise direction.

A sharp angle θ2 between the second direction Y being the first extending direction and each of the first and second alignment process direction RB1, RB2 is an angle larger than 0° and smaller than 45°. From a viewpoint of alignment control of the liquid crystal molecules, it is extremely effective that the angle θ2 is set to be approximately 5° to 25°, and more preferably, around 10°. Here, the first alignment process direction RB1 and the second alignment process direction RB2 are in a direction slightly inclined by about a several degrees, for example, 7°, with respect to the second direction Y.

Figure 6:
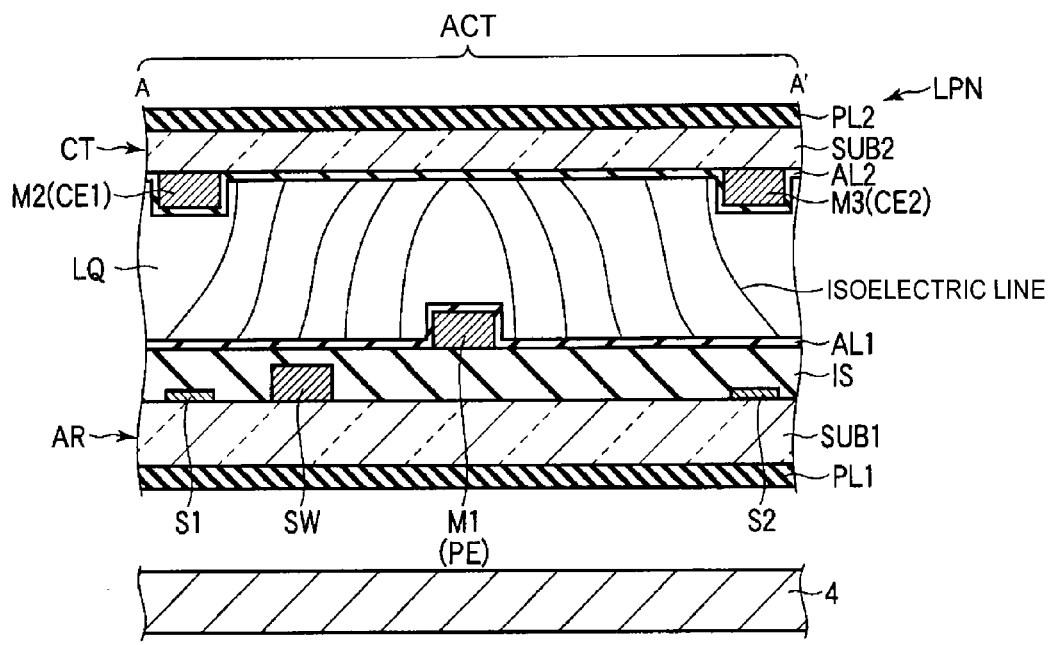
FIG. 6 is a cross-sectional view schematically showing a cross-section of the liquid crystal display panel including a first main electrode, a second main electrode, and a third main electrode and a switching element in the unit constituent shown in FIG. 5.

FIG. 6 is a cross-sectional view schematically showing the cross section of the liquid crystal display panel LPN including the first main electrode M1, second main electrode M2, third main electrode M3, and switching element SW of the unit constituent shown in FIG. 5. Here, an isoelectric line is shown in a state where a potential difference is formed among the first main electrode M1, the second main electrode M2, and the third main electrode M3.

The array substrate AR is formed using a first insulating substrate SUB1 having a light transmissive characteristic, such as a glass substrate or a plastic substrate. This array substrate AR includes the source lines S1 and S2, the switching element SW, the pixel electrode PE, the first alignment layer AL1, and the like on the side opposite to the counter substrate CT of the first insulating substrate SUB1.

The switching element SW may be a top gate-type switching element or bottom gate-type switching element, and includes a semiconductor layer formed of a poly-silicon or amorphous silicon, though the detailed description thereof is not shown. In the illustrated example, the source lines S1 and S2 and the switching element SW are covered with an insulating layer IS.

The pixel electrode PE is disposed above the source lines S1 and S2, i.e., on the side of the counter substrate CT. In the illustrated example, the pixel electrode PE is formed on the insulating layer IS and is electrically connected to the switching element SW via a contact hole formed in the insulating layer IS. The first main electrode M1 of the pixel electrode PE or the unillustrated first auxiliary electrode and second auxiliary electrode are not disposed in the positions right above the source lines S1 and S2. Such pixel electrode PE is formed of a conductive material having a light transmissive characteristic, such as Indium Tin Oxide (ITO) or Indium Zinc Oxide (IZO).

The first alignment layer AL1 is disposed on a surface facing the counter substrate CT of the array substrate AR and extends over a substantially entire region of the active area ACT. The first alignment layer AL1 covers the pixel electrode PE. Such first alignment layer AL1 is formed of a material showing a lateral alignment. The alignment process is performed on the first alignment layer AL1 so as to have the first alignment process direction RB1 as shown in FIG. 5 and the like.

On the other hand, the counter substrate CT is formed using a second insulating substrate SUB2 having a light transmissive characteristic, such as a glass substrate or a plastic substrate, for example. The counter substrate CT includes the counter electrode CE including the first counter electrode CE1 and the second counter electrode CE2 and the second alignment layer AL2, and the like on the side facing the array substrate AR of the second insulating substrate SUB2. Note that the counter substrate CT may include a black matrix dividing each pixel PX and a color filter layer which is disposed corresponding to each pixel PX, an overcoat layer to weaken the influence of the uneven surface of the color filter layer, and the like.

The second main electrode M2 of the first counter electrode CE1 is disposed in a position not above the first main electrode M1, and is disposed in a position right above the source line S1 here. The third main electrode M3 of the second counter electrode CE2 is disposed in a position not above the first main electrode M1 and is disposed in a position right above the source line S2 here. In other words, the second main electrode M2 and the third main electrode M3 are disposed on the both sides of the position above the main electrode M1 and do not face the first main electrode M1. The counter electrodes CE including the first counter electrode CE1 and the second counter electrode CE2 is formed of a conductive material having a light transmissive characteristic such as ITO or IZO.

The second alignment layer AL2 is disposed in a surface of the counter substrate CT facing the array substrate AR and extends over a substantially entire region of the active area ACT. The second alignment layer AL2 covers the counter electrode CE. The second alignment layer AL2 is formed of a material having a lateral alignment. The alignment process is performed on the second alignment layer AL2 so as to have the second alignment process direction RB2 as shown in FIG. 5 and the like.

The above-described array substrate AR and counter substrate CT are respectively disposed so that the first alignment layer AL1 and second alignment layer AL2 thereof would face each other. At this time, for example, a columnar spacer which is integrally formed on one of the substrates and is formed of a resin material is disposed between the first alignment layer AL1 of the array substrate AR and the second alignment layer AL2 of the counter substrate CT, whereby a predetermined gap, for example a cell gap with 3 to 7 μm is formed. The array substrate AR and the counter substrate CT are stuck to each other with an unillustrated sealing material with the predetermined gap being formed therebetween.

The liquid crystal layer LQ is held by the cell gap formed between the array substrate AR and the counter substrate CT and is disposed between the first alignment layer AL1 and the second alignment layer AL2. The liquid crystal layer LQ includes liquid crystal molecules which are not shown in the figure. The liquid crystal layer LQ is configured of a positive-type liquid crystal material.

A first polarizer PL1 having a first polarizing axis is adhered with an adhesive or the like to an outer surface of the first insulating substrate SUB1 configuring the array substrate AR. Also, a second polarizer PL2 having a second polarizing axis is adhered with an adhesive or the like to an outer surface of the counter substrate CT, i.e., an outer surface of the second insulating substrate SUB2 configuring the counter electrode CT.

In the embodiment, the first polarizing axis of the first polarizer PL1 and the second polarizing axis of the second polarizer PL have a mutually-perpendicular positional relationship. One of the polarizers is disposed so that the polarizing axis thereof would be parallel with or perpendicular to a longitudinal direction of the liquid crystal molecules LM in the initial alignment state, i.e., the first alignment process direction RB1 or the second alignment process direction RB2. With this configuration, a normally black mode is realized.

In other words, when an electric field is not exist (the OFF time), a potential difference is not formed between the pixel electrode PE and the first counter electrode CE1 and between the pixel electrode PE and the second counter electrode CE2. At this time, the liquid crystal molecules LM of the liquid crystal layer LQ are aligned in a direction parallel with the first alignment process direction RB1 and the second alignment process direction RB2. This alignment direction of the liquid crystal molecules LM during the OFF time corresponds to the initial alignment direction. Accordingly, during the OFF time, the liquid crystal molecules LM are aligned so that the longitudinal axis thereof would be parallel with the reference straight line LR.

Note that in a narrow sense, the liquid crystal molecules LM are not necessarily aligned parallel to the X-Y plane and are often pretilt. For this reason, for providing a simple description, a direction in which the alignment direction of the liquid crystal molecules LM during the OFF time is orthographically projected on the X-Y plane is used as the initial alignment direction of the liquid crystal molecules LM in a narrow sense here. For providing further simpler description, hereinafter it is assumed that the liquid crystal molecules LM are aligned parallel with the X-Y plane and the description is given of the case where the liquid crystal molecules LM rotate within a surface parallel with the X-Y plane.

One part of the light from the back light 4 transmits the first polarizer PlA and enters the liquid crystal display panel LPN. The polarized state of the light entering the liquid crystal display panel LPN varies depending on the alignment state of the liquid crystal molecules LM at the time of passing through the liquid crystal layer LQ. During the OFF time, the light passing through the liquid crystal layer LQ is absorbed by the second polarizer PL2 (displayed in black).

On the other hand, in a state where a potential difference is formed between the pixel electrode PE and the counter electrode CE (the ON time), as shown in FIG. 6, a lateral electric field (or oblique electric field) parallel with the substrates is formed between the first main electrode M1 and the second main electrode M2 and between the first main electrode M1 and the third main electrode M3. With this configuration, the liquid crystal molecules LM rotate within a plane substantially parallel with the principal surface of the substrate so that the longitudinal direction thereof would be substantially parallel with the direction of the electric field.

In the example shown in FIG. 5, the liquid crystal molecules LM between the first main electrode M1 and the second main electrode M2 rotate in the counterclockwise direction along the lateral electric filed between the first main electrode M1 and the second main electrode M2 and are aligned so as to face to the left side in the figure with respect to the second direction Y. The liquid crystal molecules LM between the first main electrode M1 and the third main electrode M3 rotate in the counterclockwise direction along the lateral electric field between the first main electrode M1 and the third main electrode M3 and are aligned so as to face the right side in the figure with respect to the second direction Y.

As described above, in a state where the lateral electric field is formed between the pixel electrode PE and the counter electrode CE in each pixel PX, the alignment direction of the liquid crystal molecules LM is divided into two directions and a domain is formed in each alignment direction. In other words, in the illustrated example, two domains are formed in each pixel PX.

One part of the light from the back light entering the liquid crystal display panel LPN changes the polarization state thereof when passing through an interstice between the first main electrode M1 and the second main electrode M2 and an interstice between the first main electrode M1 and the third main electrode M3. The light passing through the liquid crystal layer LQ during the ON time transmits the second polarizer PL2 (displayed in white). In other words, the interstice between the first main electrode M1 and the second main electrode M2 and the interstice between the first main electrode M1 and the third main electrode M3 serve as apertures (or transmissive portions) each contributing to the display.

According to this embodiment, two domains can be formed within one pixel, so that a viewing angle can be optically compensated in the two directions and a wider viewing angle can be provided. Accordingly, a liquid crystal display device having a good display quality can be provided.

Also, according to the embodiment, the first auxiliary electrode A1 is disposed between the first end side of the pixel electrode PE and the source line S1 while the second auxiliary electrode A2 is disposed between the second end side of the pixel electrode PE and the source line S2. Accordingly, during the ON time, an electric field for driving the liquid crystal molecules LM in the area therebetween is enhanced. That is to say, an undesired electric field which may cause disorder of the alignment of the liquid crystal molecules LM can be prevented from occurring.

In addition, according to this embodiment, the fourth auxiliary electrode A4 is disposed between the first end side of the pixel electrode PE and the source line S2 in addition to the first auxiliary electrode A1 and the second auxiliary electrode A2. Also, the third auxiliary electrode A3 is disposed between the second end side of the pixel electrode PE and the source line S1. Accordingly, similar to the case where the first auxiliary electrode A1 and the second auxiliary electrode A2 are disposed, during ON time, en electric field for driving the liquid crystal molecules LM in the area therebetween can be enhanced.

Figure 7:
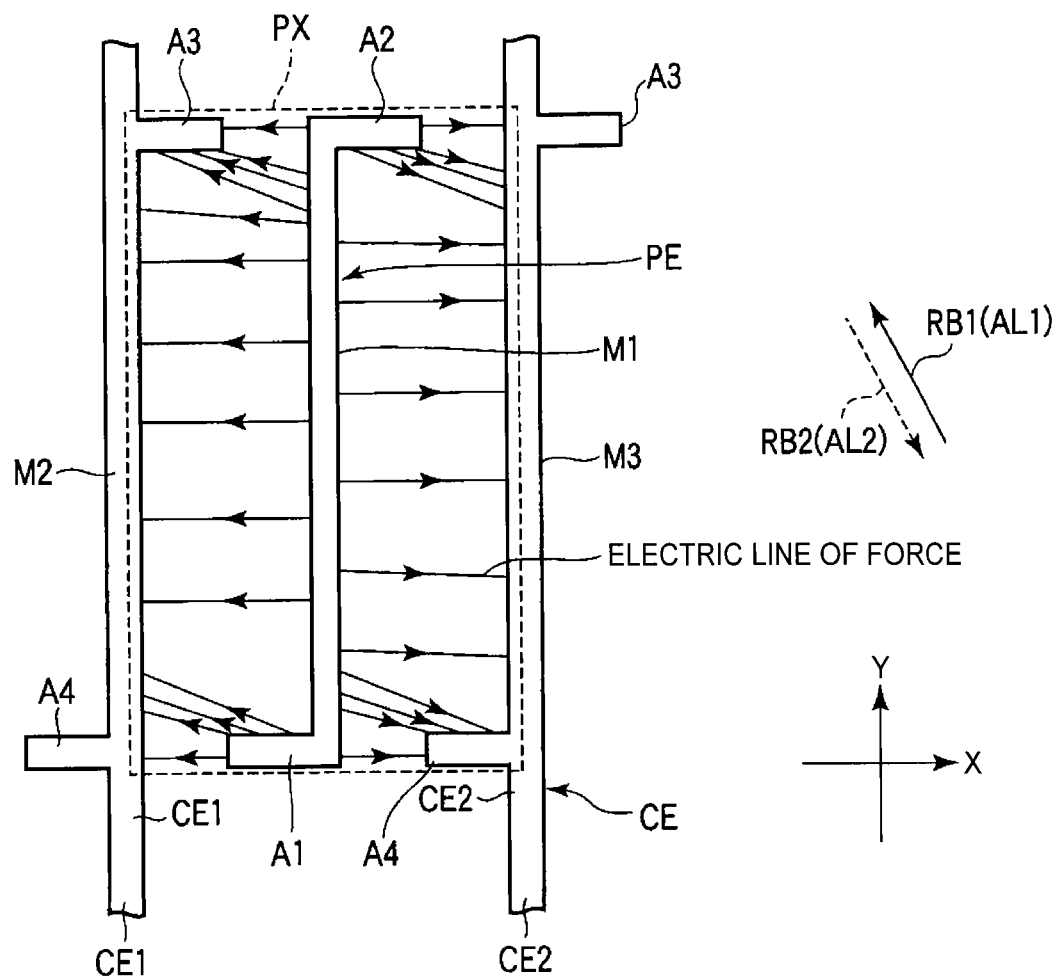
FIG. 7 is a schematic diagram of an electric line of force expressing an electric field generated when a positive voltage is applied to a pixel electrode PE and a negative voltage is applied to a counter electrode CE in an example shown in FIG. 5.

Furthermore, the foregoing description is further described by using FIG. 7. FIG. 7 is a schematic view of electric line of force showing an electric field generated when a positive voltage is applied to the pixel electrode PE and a negative voltage is applied to the counter electrode CE.

With regard to the electric field generated between the first auxiliary electrode A1 and the second main electrode M2 of the first counter electrode CE1, there is an electric field having a direction same as that of the electric field generated between the first main electrode M1 and the second main electrode M2, i.e., an electric line of force substantially vertical to the first main electrode M1. Also, different from the above-described electric field, there is an electric field oblique to the first main electrode M1, i.e., an oblique electric line of force inclined to the first main electrode M1. This oblique electric field is formed in the direction intersecting, at a sharp angle in the counterclockwise direction, the first main electrode M1 and the second main electrode M2 parallel with the first main electrode M1, as similar to the first alignment process direction RB1 and the second alignment process direction RB2.

The oblique electric filed generated between the first auxiliary electrode A1 and the second main electrode M2 has effects to help the rotation in a direction in which the liquid crystal molecules LM should be rotated essentially and to prevent the liquid crystal molecules LM from rotating in a direction opposite to the direction in which the liquid crystal molecules LM should be rotated. In other words, when a voltage is applied (ON time), the alignment direction of the liquid crystal molecules LM in a pixel end portion is substantially same as the alignment direction of the liquid crystal molecules LM in the vicinity of the pixel center. Thus, the continuity of the alignment of the liquid crystal molecules LM from the vicinity of the center of the pixel to the pixel end portion can be maintained. For this reason, a disclination which is generated from a discontinuity of the alignment of the liquid crystal molecules LM can be suppressed within the pixel. Also, although it is not shown in the figure, there is a possibility that between the illustrated pixel PX and its adjacent pixel on the lower side, an electric filed may be formed extending downward to the left from the first auxiliary electrode A1 to the second main electrode M2 (or the third auxiliary electrode A3 disposed corresponding to the lower pixel). However, the electric filed formed in such direction is blocked by the first auxiliary electrode A1 disposed corresponding to the pixel PX or the third auxiliary electrode A3 disposed corresponding to the lower pixel. In other words, the first auxiliary electrode A1 and the third auxiliary electrode A3 suppress the intrusion of the electric filed which tries to cause the liquid crystal molecules LM to be aligned in an undesired direction. Accordingly, the disclination caused by the undesired alignment of the liquid crystal molecules can be prevented from being generated within each pixel.

In addition, with regard to the electric field generated between the first electrode M1 in a direction opposite to the direction in which the first auxiliary electrode A1 extends and the fourth auxiliary electrode A4 of the second counter electrode CE2, there is the electric filed in a direction same as that of the electric filed generated between the first main electrode M1 and the third main electrode M3, i.e., the electric line of force substantially vertical to the first main electrode M1. Also, different from the above-described electric filed, an electric filed oblique to the main electrode M1, i.e., an oblique electric line of force inclined to the first main electrode M1 is also generated between the fourth auxiliary electrode A4 and the first main electrode M1. The oblique electric field is formed in the direction intersecting, at a sharp angle in the counterclockwise direction, the first main electrode M1 and the third main electrode M3 parallel with the first main electrode M1 similar to the first alignment process direction RB1 and the second alignment process direction RB2.

The oblique electric filed generated between the fourth auxiliary electrode A4 and the first main electrode M1 has effects to help the rotation in a direction in which the liquid crystal molecules LM should be rotated essentially and to prevent the liquid crystal molecules LM from rotating in a direction opposite to the direction in which the liquid crystal molecules LM should be rotated in the end portion of the pixel electrode PE. In other words, when a voltage is applied (ON time), the alignment direction of the liquid crystal molecules LM in a pixel end portion is substantially same as the alignment direction of the liquid crystal molecules LM in the vicinity of the pixel center. Thus, the continuity of the alignment of the liquid crystal molecules LM from the vicinity of the center of the pixel to the pixel end portion can be maintained. For this reason, a disclination which is generated from a discontinuity of the alignment of the liquid crystal molecules LM can be suppressed within the pixel. Also, although it is not shown in the figure, there is a possibility that, between the illustrated pixel PX and an adjacent lower pixel on the lower side, an electric filed may be formed extending upward to the right from the second auxiliary electrode A2 of the pixel electrode disposed corresponding to the lower pixel, to the third main electrode M3 (or the fourth auxiliary electrode A4 disposed corresponding to the pixel PX). However, the electric filed formed in such direction is blocked by the fourth auxiliary electrode A4 disposed corresponding to the pixel PX or the second auxiliary electrode A2 disposed corresponding to the lower pixel. In other words, the second auxiliary electrode A2 and the fourth auxiliary electrode A4 suppress the intrusion of the electric filed which tries to cause the liquid crystal molecules LM to be aligned in an undesired direction. Accordingly, the disclination caused by the undesired alignment of the liquid crystal molecules can be prevented from being generated within each pixel.

Furthermore, the same is true to an electric field generated between the second auxiliary electrode A2 and the third main electrode M3 of the second counter electrode CE2 and an electric field generated between the first main electrode M1 in a direction opposite to the direction in which the second auxiliary electrode A2 extends and the third auxiliary electrode A3 of the first counter electrode CE1. By providing the second auxiliary electrode A2 and the third auxiliary electrode A3, the above-described effects can be similarly obtained.

The condition that the effects can be obtained are such that in a pixel in which a pixel electrode PE or a counter electrode CE includes a main electrode and an auxiliary electrode connected to the main electrode, in which the pixel electrode PE or counter electrode CE is seen in a director direction of liquid crystal molecules LM when a voltage is not applied (OFF time) in the vicinity of the center of the pixel, either the main electrode or the auxiliary electrode connected to the main electrode is provided. That is to say, the condition under which the above-described effects can be obtained is such that an auxiliary electrode is not provided from a base point on the main electrode (e.g., the center "O" of the pixel electrode PE) to the director direction of the liquid crystal molecules LM when a voltage is not applied. Alternately, the condition under which the above-effects can be obtained is such that the auxiliary electrode extends in the clockwise direction from the main electrode in case the initial alignment direction of the liquid crystal molecules LM is a direction downward to the right (or a direction upward to the left) and the auxiliary electrode extends in the counterclockwise direction from the main electrode in case the initial alignment direction of the liquid crystal molecules LM during the OFF time is the direction downward to the left (or the direction upward to the right).

By fulfilling the above-described conditions, the phenomenon of rotation in a reverse direction (in this case, the clockwise direction) opposite to the direction in which the liquid crystal molecules LM in these areas should be rotated essentially (in the illustrated example, the counterclockwise direction) can be suppressed to be generated. For this reason, the generation of a dark line which is generated along with a boundary of undesired domains generated within one pixel can be suppressed, and the decrease in a transmissivity can be suppressed.

In particular, even when the liquid crystal panel LPN is subjected to external stress so as to be pressed, a phenomenon such that a state of being pressed remains by the decrease of the transmissivity in a local pixel PX can be prevented from easily occurring since the electric filed for driving the liquid crystal molecules LM in the direction to be rotated essentially is enhanced. Thus, a display quality can be maintained in a good state.

In this embodiment, it is desirable that θ2 be larger than 0° and smaller than 45°. When θ2 is equal to or larger than 45°, it is difficult for the liquid crystal molecules LM to uniformly rotate in the above-described direction in each area when the electric field is formed between the pixel electrode PE and the counter electrode CE and the disorder of the alignment tends to be easily generated. On the other hand, when θ2 is a sharp angle smaller than 45°, even if the strength of the electric field between the pixel electrode PE and the counter electrode CE is relatively small, the liquid crystal molecules LM uniformly rotate in the above-described direction in each area. Thus, two domains can be stably formed.

Note that, when the misalignment of the array substrate AR with the counter substrate CT is caused, a difference may be caused in distances with the second main electrode M2 and the third main electrode M3 on both sides of the first main electrode M1. However, such difference in the alignment is commonly generated in all the pixels PX. Thus, an electric field distribution does not change between the pixels PX, and an image display is not affected.

Also, even when an electrode-to-electrode distance between the first main electrode M1 and the second main electrode M2 is largely different from an electrode-to-electrode distance between the first main electrode M1 and the third main electrode M3, the rotation direction of the liquid crystal molecules LM is the same in each area (in the illustrated example, the counterclockwise direction), and thus it becomes easier to align the liquid crystal molecules LM in each area. Accordingly, the decrease in the transmissivity of the liquid crystal display panel LPN due to an alignment abnormality can be suppressed.

Note that since a lateral electric field is hardly formed in the vicinity of the first main electrode M1 of the pixel electrode PE, the vicinity of the second main electrode M2 of the first counter electrode CE, and the vicinity of the third main electrode M3 of the second counter electrode CE2 (or an electric field enough to drive the liquid crystal molecules LM is not formed) during the ON time, the liquid crystal molecules LM hardly move from the initial alignment direction similar to the OFF time. For this reason, although the pixel electrode PE and the counter electrode CE are formed of a conductive material having a light transmissive characteristic in the embodiment, the light from the back light is hardly transmitted in these areas and they do not contribute to an image display during the ON time. Accordingly, the pixel electrode PE and the counter electrode CE are not necessarily formed of a transparent conductive material and may be formed of a conductive material such as aluminum or silver.

Also, the first alignment process direction RB1 and the second alignment process direction RB2 are parallel with each other and the directions thereof are opposite to each other in the example shown in FIG. 3 and the like, but may have a same direction. When the first alignment process direction RB1 and the second alignment process direction RB2 are parallel with each other and have a same direction, during the OFF time, the liquid crystal molecules LM are aligned in a substantially lateral direction (a pretilt angle is zero) in the intermediate position of the liquid crystal layer LQ, and using that position, aligned with a pretilt angle so as to be symmetric in the vicinity of the first alignment layer AL1 and the vicinity of the second alignment layer AL2 (splay alignment). When the first alignment process direction RB1 and the second alignment process direction RB2 are parallel with each other and have directions opposite to each other, during the OFF time, the liquid crystal molecules LM are aligned with a substantially same pretilt angle in the vicinity of the first alignment layer AL1, the vicinity of the second alignment layer AL2, and the intermediate portion of the liquid crystal layer LQ (homogeneous alignment).

With regard to the first configuration example, for example, a configuration having a mirror image relationship with the configuration shown in FIG. 5 may be employed. The configuration in this case is as follows.

That is, although it is not shown in the figure, the pixel electrode PE includes the first main electrode M1, the first auxiliary electrode A1 extending from the first end side of the first main electrode M1 toward the source line S2 positioned on the right side, and the first auxiliary electrode A2 extending to the source line S1 positioned on the left side from the second end side of the first main electrode M1. In other words, these first main electrode M1, first auxiliary electrode A1, and second auxiliary electrode A2 form an inverse S-letter shape or a substantially Z-letter shape.

The first counter electrode CE1 is positioned on the left side of the pixel electrode PE (or positioned adjacent to the portion above the source line S1) and the second counter electrode CE2 is positioned on the right side of the pixel electrode PE (or a position adjacent to the portion above the source line S2). The first counter electrode CE1 includes the second main electrode M2 and the third auxiliary electrode A3 extending from a position lined up with the first end side of the first main electrode M1 in the second main electrode M2 toward the second counter electrode CE2. The second counter electrode CE2 includes the third main electrode M3 and the fourth auxiliary electrode A4 extending from the position lined up with the second end side of the first main electrode M1 in the third main electrode M3 toward the first counter electrode CE1.

At this time, the first alignment process direction of the first alignment layer AL1 covering the pixel electrode PE and the second alignment process direction of the second alignment layer AL2 covering the counter electrode CE are set in a direction parallel with the reference straight line passing between the second end side of the first main electrode M1 and the source line S2 and between the first end side of the first main electrode M1 and the source line S1. Even with this configuration, the effects similar to those of the above-described example can be obtained.

In the pixel electrode PE, the first auxiliary electrode A1 and the second auxiliary electrode A2 are not necessarily formed in the lower end portion or upper end portion of the first main electrode M1 like the example shown in the figure, but may be formed in a position shifted toward the center "O" of the pixel electrode PE from the lower end portion or upper end portion.

Note that, in the above-described example, the description is given of the case where the first auxiliary electrode A1 extends to the source line S1 and the second auxiliary electrode A2 extends to the source line S2. However, the source line S1 and the source line S2 may be replaced by a gate line G or an auxiliary capacitance line C. In other words, the first auxiliary electrode A1 and the second auxiliary electrode A2 may extend to the gate line G or the auxiliary capacitance line C.

The illustrated example describes the configuration in which the pixel electrode PE, the first counter electrode CE1, and the second counter electrode CE2 respectively include auxiliary electrodes. However, effects similar to those of the above-described example can be obtained by the configuration in which the pixel electrode PE includes an auxiliary electrode but the counter electrode CE does not include any auxiliary electrode.

Figure 8:
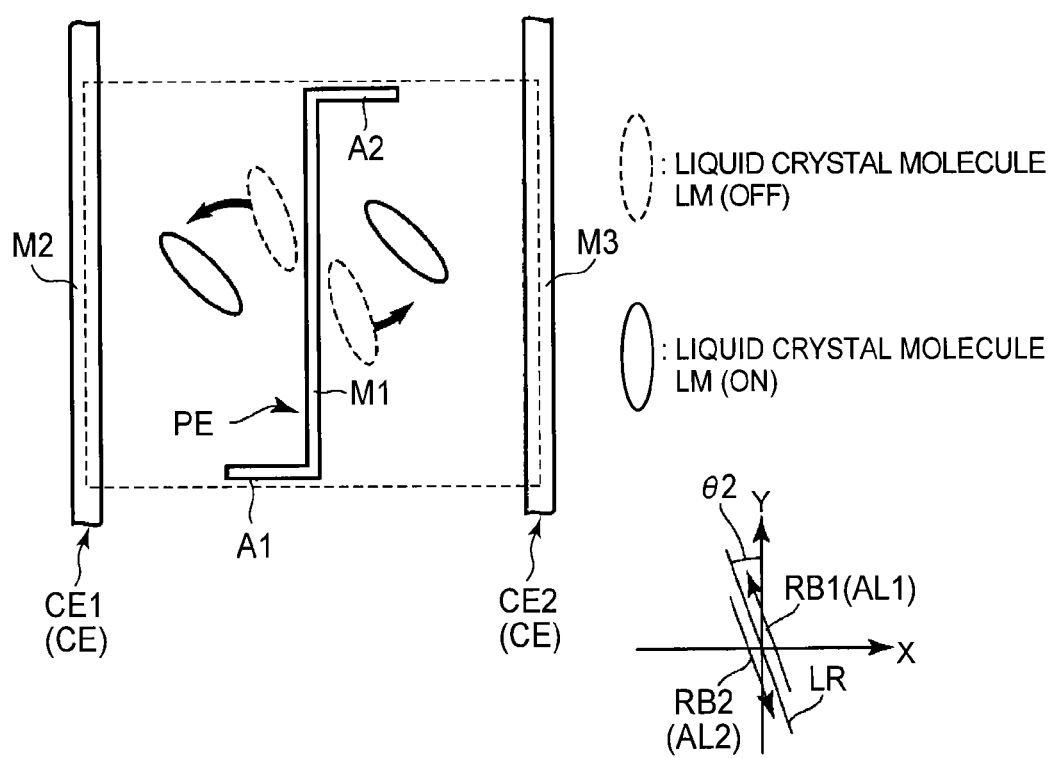
FIG. 8 is a plan view schematically showing another unit constituent in the one pixel of the first configuration example.

FIG. 8 is a plan view schematically showing another unit constituent in one pixel PX in the first configuration example.

Similar to the example shown in FIG. 5, the pixel electrode PE includes the first main electrode M1, the first auxiliary electrode A1, and the second auxiliary electrode A2. The first counter electrode CE1 includes the second main electrode M2. The second counter electrode CE2 includes the third main electrode M3. The first counter electrode CE1 and the second counter electrode CE2 do not include an auxiliary electrode.

With regard to the first alignment process direction RB1 of the first alignment layer AL1 covering the pixel electrode PE and the second alignment process direction RB2 of the second alignment layer AL2 covering the counter electrode CE are similar to the example in the example shown in FIG. 5.

During the ON time, the liquid crystal molecules LM between the first main electrode M1 and the second main electrode M2 rotate in the counterclockwise direction along the lateral electric field between the first main electrode M1 and the second main electrode M2 and are aligned so as to face the left side in the figure with respect to the second direction Y. Also, the liquid crystal molecules LM between the first main electrode M1 and the third main electrode M3 rotate in the counterclockwise direction along the lateral electric field between the first main electrode M1 and the third main electrode M3 and are aligned so as to face the right side in the figure with respect to the second direction Y.

An operation of this configuration along with the first auxiliary electrode A1 and the second auxiliary electrode A2 is briefly described.

Figure 9:
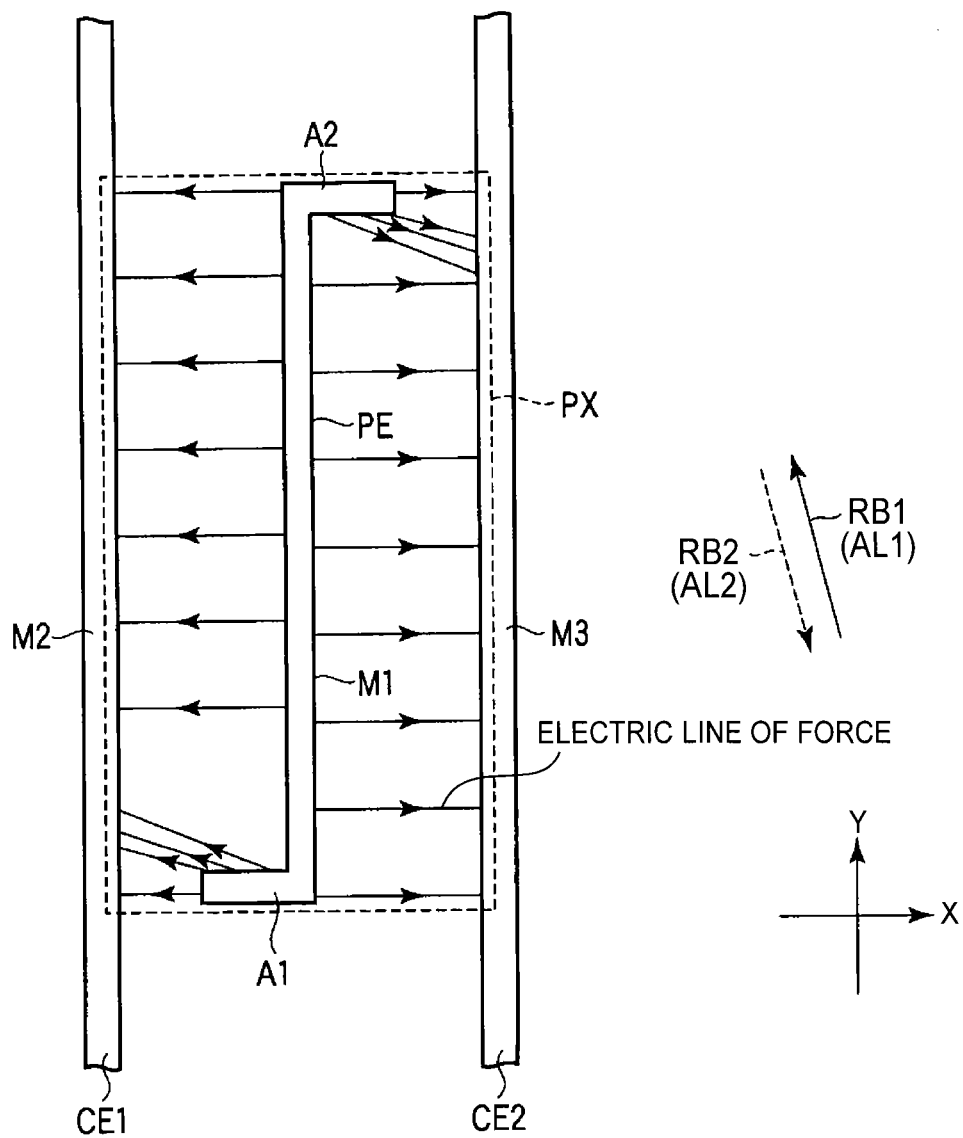
FIG. 9 is a schematic diagram of an electric line of force expressing an electric field generated when a positive voltage is applied to a pixel electrode PE and a negative voltage is applied to a counter electrode CE in an example shown in FIG. 8.

FIG. 9 is a schematic view of an electric line of force expressing an electric field generated when a positive voltage is applied to the pixel electrode PE and a negative voltage is applied to the counter electrode CE.

With regard to the electric field generated between the first auxiliary electrode A1 and the second main electrode M2 of the first counter electrode CE1, an electric line of force substantially vertical to the first main electrode M1 and an oblique electric line of force inclined to the first main electrode M1 are generated. The oblique electric field is formed in the direction intersecting, at a sharp angle in the counterclockwise direction, the first main electrode M1 and the second main electrode M2 similar to the first alignment process direction RB1 and the second alignment process direction RB2.

The oblique electric filed generated between the first auxiliary electrode A1 and the second main electrode M2 has effects to help the rotation in a direction in which the liquid crystal molecules LM should be rotated essentially and to prevent the liquid crystal molecules LM from rotating in a direction opposite to the direction in which the liquid crystal molecules LM should be rotated. For this reason, a disclination which is generated from a discontinuity of the alignment of the liquid crystal molecules LM can be suppressed within the pixel.

Also, with regard to the electric field generated between the first main electrode M1 in a direction opposite to the direction in which the first auxiliary electrode A1 extends and the second counter electrode CE2, an electric line of force substantially vertical to the first main electrode M1 and an oblique electric line of force inclined to the first main electrode M1 are generated. The oblique electric field is formed from the first main electrode M1 to the second counter electrode CE2 toward an outside of the illustrated pixel PX. The inclination of the electric field is formed in a direction intersecting, at a sharp angle in the counterclockwise direction, the first main electrode M1 and the third main electrode M3 parallel with the first main electrode M1 similar to the first alignment process direction RB1 and the second alignment process direction RB2.

The oblique electric field generated between the first main electrode M1 and the second counter electrode CE2 has effects in the end portion of the pixel electrode PE to help the liquid crystal molecules LM to rotate in a direction in which the liquid crystal molecules LM should be rotated essentially and to prevent the liquid crystal molecules LM from rotating in a direction opposite to the direction in which the liquid crystal molecules LM should be rotated. In other words, when a voltage is applied (ON time), the alignment direction of the liquid crystal molecules LM in the pixel end portion is substantially same as the alignment direction of the liquid crystal molecules LM in the vicinity of the pixel center. Thus, the continuity of the alignment of the liquid crystal molecules LM from the vicinity of the pixel center to the pixel end portion is maintained. Accordingly, the disclination generated from the discontinuity of the alignment of the liquid crystal molecules LM can be suppressed within the pixel.

Hereinafter, a second configuration example of the present embodiment is described.

Figure 10:
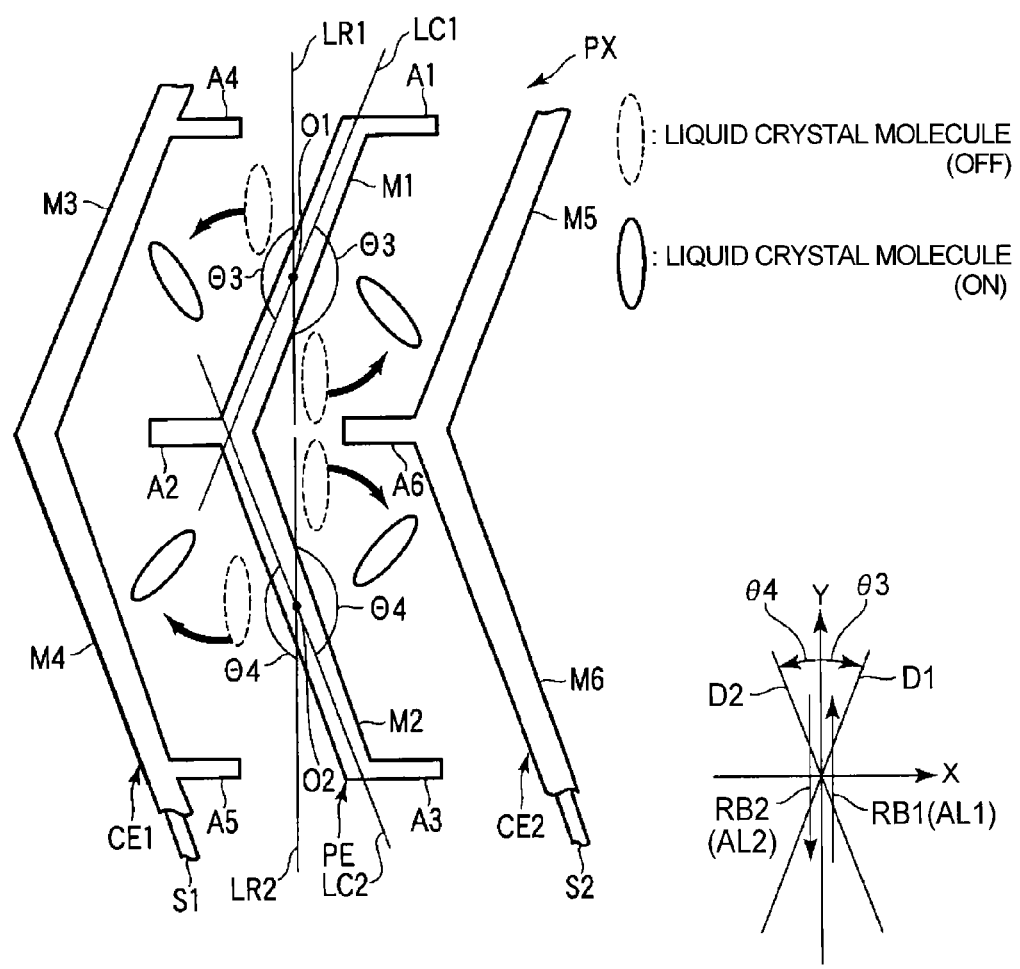
FIG. 10 is a plan view schematically showing a minimum unit constituent in one pixel of a second configuration example.

FIG. 10 is a plan view schematically showing a minimum unit constituent in one pixel PX of the second configuration example. In the example shown here, a first alignment process direction RB1 of a first alignment layer AL1 covering a pixel electrode PE and a second alignment process direction RB2 of a second alignment layer AL2 covering a counter electrode CE are parallel with a second direction Y. In other words, an initial alignment direction of liquid crystal molecules LM corresponds to the second direction Y, but may be another direction other than the second direction Y.

The pixel electrode PE includes a first main electrode M1, a second main electrode M2, a first auxiliary electrode A1, a second auxiliary electrode A2, and a third auxiliary electrode A3.

The first main electrode M1 extends like a belt in a first extending direction D1. The second main electrode M2 extends like a belt in a second extending direction D2 different from the first extending direction D1. The first end side of the first main electrode M1 and the first end side of the second main electrode M2 are connected. In the illustrated example, the first main electrode M1 and the second main electrode M2 form a dog-leg shape.

Here, the first extending direction D1 is a direction intersecting the initial alignment direction (the second direction Y) at a sharp angle in the clockwise direction, while the second extending direction D2 is a direction intersecting the initial alignment direction (the second direction Y) of the liquid crystal molecules LM at a sharp angle in the counterclockwise direction. An angle θ3 between the initial alignment direction and the first extending direction D1 is substantially same as an angle θ4 between the initial alignment direction and the second extending direction D2. Also, the angles θ3 and θ4 are larger than 0° and smaller than 45°, and are approximately 5° to 25°, more preferably, around 10°.

The first auxiliary electrode A1 extends like a belt from the second end side of the first main electrode M1 in a direction different from the first extending direction D1 and the second extending direction D2. The second auxiliary electrode A2 extends like a belt from the connected portion of the first main electrode M1 with the second main electrode M2 in a direction different from the first extending direction D1 and the second extending direction D2. The third auxiliary electrode A3 extends like a belt from the second end side of the second main electrode M2 in a direction different from the first extending direction D1 and the second extending direction D2. In the illustrated example, the first auxiliary electrode A1 and the third auxiliary electrode A3 extend toward the right side (i.e., toward the source line S2 being a second line), while the second auxiliary electrode A2 extends toward the left side (i.e., the source line S1 being a first line).

The first counter electrode CE1 includes a third main electrode M3, a fourth main electrode M4, a fourth auxiliary electrode A4 and a fifth auxiliary electrode A5.

The third main electrode M3 extends like a belt in the first extending direction D1. The third main electrode M3 is arranged on the first main electrode M1 without overlapping. The fourth main electrode M4 extends like a belt in the second extending direction D2 without overlapping. The fourth main electrode M4 is arranged on the second main electrode M2. A first end side of the third main electrode M3 and a first end side of the fourth main electrode M4 are connected. In the illustrated example, the third main electrode M3 and the fourth main electrode M4 form a dogleg shape.

The fourth auxiliary electrode A4 extends like a belt from a position lined up with the first end side of the first main electrode M1 in the third main electrode M3 to the second counter electrode CE2. The fifth auxiliary electrode A5 extends like a belt from a position lined up with the second end side of the second main electrode M2 in the fourth main electrode M4 to the second counter electrode CE2. The direction in which the fourth auxiliary electrode A4 and the fifth auxiliary electrode A5 extend is different from the first extending direction D1 and the second extending direction D2. In the illustrated example, the fourth auxiliary electrode A4 and the fifth auxiliary electrode A5 extend to the right side and the extending directions thereof are parallel with the first direction X.

The second counter electrode CE2 includes a fifth main electrode M5, a sixth main electrode M6, and a sixth auxiliary electrode A6.

The fifth main electrode M5 extends like a belt in the first extending direction D1. The fifth main electrode M5 is disposed on a side opposite to the third main electrode M3 across the portion right above the first main electrode M1. In other words, the third main electrode M3 and the fifth main electrode M5 are disposed on both sides of the first main electrode M1. The third main electrode M3 of the first counter electrode CE1, the first main electrode M1 of the pixel electrode PE, and the fifth main electrode M5 of the second counter electrode CE2 are sequentially arranged in this order from the left to the right in the figure in the first direction X.

The sixth main electrode M6 extends like a belt along the second extending electrode D2. The sixth main electrode M6 is disposed on a side opposite to the fourth main electrode M4 across the portion right above the second main electrode M2. In other words, the fourth main electrode M4 and the sixth main electrode M6 are disposed on both sides of the second main electrode M2. The fourth main electrode M4 of the first counter electrode CE1, the second main electrode M2 of the pixel electrode PE, and the sixth main electrode M6 of the second counter electrode CE2 are sequentially arranged in this order from the left to the right in the figure in the first direction X.

The sixth auxiliary electrode A6 extends like a belt from the connected portion of the fifth main electrode M5 with the sixth main electrode M6 toward the first counter electrode CE1. The direction in which the sixth auxiliary electrode A6 extends is different from the first extending direction D1 and the second extending direction D2. In the illustrated example, the sixth auxiliary electrode A6 extends to the left and the extending direction thereof is parallel with the first direction X.

Here, the first alignment process direction RB1 of the first alignment layer LA1 and the second alignment process direction RB2 of the second alignment layer AL2 are parallel with each other and have a direction passing through an interstice between the second end side of the first main electrode M1 and the source line S1 being the first line and an interstice between the second end side of the second main electrode M2 and the source line S1 being the first line.

A relationship between the areas in which the first auxiliary electrode A1, the second auxiliary electrode A2, and the third auxiliary electrode A3 are disposed and the first alignment process direction RB1 and the second alignment process direction RB2 is as follows. That is, the first auxiliary electrode A1 and the second auxiliary electrode A2 are disposed in an area where an angle θ3 between the first reference straight line LR1 which is parallel with the initial alignment direction (here, the second direction Y) of the liquid crystal molecules LM and passes through the first center O1 of the first main electrode M1 and the first center line LC1 which is parallel with the first extending direction D1 and passes through the first center O1 of the first main electrode M1 is an obtuse angle. Also, the second auxiliary electrode A2 and the third auxiliary electrode A3 are disposed in an area where an angle θ4 between a second reference straight line LR2 which is parallel with the initial alignment direction of the liquid crystal molecules LM (here, the second direction Y) and passes through the second center O2 of the second main electrode M2 and a second center line LC2 which is parallel with the second extending direction D2 and passes through the second center O2 of the second main electrode M2 is an obtuse angle.

Note that the fourth auxiliary electrode A4 extends in a direction same as that of the first auxiliary electrode A1 (here to the right) and the fifth auxiliary electrode A5 extends in a direction same as that of the third auxiliary electrode A3 (here to the right). The sixth auxiliary electrode A6 extends in a direction same as that of the second auxiliary electrode A2 (here to the left).

In the second configuration example, the liquid crystal molecules LM of the liquid crystal layer LQ of the pixel PX are aligned in a direction parallel with the first alignment process direction RB1 and the second alignment process direction RB2 during the OFF time. Here, the first alignment process direction RB1 and the second alignment process direction RB2 are parallel with the second direction Y. For this reason, the liquid crystal molecules LM are aligned so that the longitudinal axis thereof would be parallel with the second direction Y as shown by the broken line in the figure. At this time, display is made in black similar to the first configuration example.

On the other hand, during the ON time, a lateral electric field (or oblique electric filed) substantially parallel with the substrates is formed between the first main electrode M1 and the third main electrode M3, between the second main electrode M2 and the fourth main electrode M4, between the first main electrode M1 and the fifth main electrode M5, and between the second main electrode M2 and the sixth main electrode M6. With this configuration, the liquid crystal molecules LM rotate in a plane substantially parallel with the principal substrate surface so that the longitudinal direction thereof would be substantially parallel with the direction of the electric field.

In the illustrated example, the liquid crystal molecules LM between the first main electrode M1 and the third main electrode M3 rotate in the counterclockwise direction along the lateral electric field between the first main electrode M1 and the third main electrode M3, and are aligned so as to face an upper left direction in the figure. The liquid crystal molecules LM between the first main electrode M1 and the fifth main electrode M5 rotate in the counterclockwise direction along the lateral electric field between the first electrode M1 and the fifth main electrode M5, and are aligned so as to face the lower right in the figure.

Also, the liquid crystal molecules LM between the second main electrode M2 and the fourth main electrode M4 rotate in the clockwise direction along the lateral electric field between the second main electrode M2 and the fourth main electrode M4, and are aligned so as to face the lower left in the figure. The liquid crystal molecules LM between the second main electrode M2 and the sixth main electrode M6 rotate in the clockwise direction in the lateral electric field between the second main electrode M2 and the sixth main electrode M6, and are aligned so as to face the upper right in the figure.

As described above, in each pixel PX, in a state where the lateral electric field is formed between the pixel electrode PE and the counter electrode CE, the alignment direction of the liquid crystal molecules LM is divided into four, and a domain is formed in each of the four directions. In other words, four domains are formed in each pixel PX.

At this time, portions of the light from the back light, which enters the liquid crystal display panel LPN, a polarization state of the light is changed when passing between the first main electrode M1 and the third main electrode M3, between the first main electrode M1 and the fifth main electrode M5, the second main electrode M2 and the fourth main electrode M4, and between the second main electrode M2 and the sixth main electrode M6, and the light passing through the liquid crystal layer LQ is displayed in white after transmitting the second polarizer PL2.

According to the second configuration example of the embodiment, four domains can be formed in one pixel. Thus, a viewing angle can be optically compensated in four directions and a wider viewing angle can be provided. Accordingly, a liquid crystal display device having a good display quality can be provided.

Furthermore, an electric filed needed for driving the liquid crystal molecules LM is enhanced by the arrangement of the first auxiliary electrode A1, the second auxiliary electrode A2, and the third auxiliary electrode A3, and the arrangement of the fourth auxiliary electrode A4, the fifth auxiliary electrode A5, and the sixth auxiliary electrode A6. Accordingly, effects similar to those of the first configuration example can be obtained.

Hereinafter, an embodiment corresponding to the first configuration example is described.

[Embodiment]

An array substrate AR including a pixel electrode PE having a shape shown in FIG. 3 is prepared. Each width of a first main electrode M1 configuring the pixel electrode PE, a first auxiliary electrode A1, and a second auxiliary electrode A2 is set to be 10 µm. As for the array substrate AR, a first alignment layer AL showing a lateral alignment with a film thickness of 70 nm covering the pixel electrode PE is formed and alignment process is performed in a first alignment process direction RB1 parallel with a reference straight line LR.

On the other hand, a counter substrate CT including a counter electrode CE having a shape shown in FIG. 4 is prepared. Each width of a second main electrode M2 configuring a first counter electrode CE1 and a third auxiliary electrode A3 is set to be 10 µm. Each width of a third main electrode M3 configuring a second counter electrode CE2 and a fourth auxiliary electrode A4 is set to be 10 µm. As for the counter electrode CT, a second alignment layer AL2 showing a lateral alignment with a film thickness of 70 nm covering the counter electrode CE is formed and alignment process is performed in a second alignment process direction RB2 parallel with the reference straight line LR. An angle between a first extending direction in which the first main electrode M1, the second main electrode M2, and the third main electrode M3 extend and the reference straight light LR is set to be approximately 20°.

A cell gap of 4.0 µm is formed between the array substrate AR and the counter substrate CT to adhere the array substrate AR with the counter substrate CT. At this time, an interval between each main electrode of the pixel electrode PE and each main electrode of the counter electrode CT is set to be 10 µm. A positive-type liquid crystal material which is a product of the Merck Co. is injected between the array substrate AR and the counter substrate CT to manufacture a liquid crystal display panel LPN with a pixel pitch of 50 µm.

According to the embodiment, one pixel is divided into two domains during the ON time and a viewing angle can be compensated in the two directions. Also, according to the embodiment, even when a liquid crystal display panel PNL is pressed, a state of being pressed does not remain in the panel.

As described above, according to the embodiment, a liquid crystal display device having a good display quality can be provided.

While certain embodiments have been described, these embodiments have been presented by way of example only, and are not intended to limit the scope of the inventions. In practice, the structural and method elements can be modified without departing from the spirit of the invention. Various embodiments can be made by properly combining the structural and method elements disclosed in the embodiments. For example, some structural and method elements may be omitted from all the structural and method elements disclosed in the embodiments. Furthermore, the structural and method elements in different embodiments may properly be combined. The accompanying claims and their equivalents are intended to cover such forms or modifications as would fall with the scope of the inventions.

What is claimed is:

1. A liquid crystal display device, comprising:
a first substrate including a first line and a second line extending in directions parallel with each other, a pixel electrode having a first main electrode disposed between the first line and the second line and extending like a belt in a first extending direction, a second main electrode extending like a belt in a second extending direction different from the first extending direction and connected with the first main electrode, a first auxiliary electrode extending from a second end side of the first main electrode toward the second line, a second auxiliary electrode extending from a connected portion of the first main electrode with the second main electrode toward the first line, and a third auxiliary electrode extending from a second end side of the second main electrode toward the second line, and a first alignment layer covering the pixel electrode;
a second substrate including a first counter electrode having a third main electrode extending like a belt in the first extending direction and a fourth main electrode extending like a belt in the second extending direction and connected with the third main electrode, a second counter electrode having a fifth main electrode extending like a belt in the first extending direction and a sixth main electrode extending like a belt in the second extending direction and connected with the fifth main electrode, and a second alignment layer covering the first counter electrode and the second counter electrode; and
a liquid crystal layer including liquid crystal molecules held between the first substrate and the second substrate,
wherein the third main electrode and the fifth main electrode are disposed on both sides of the first main electrode, the fourth main electrode and the sixth main electrode are disposed on both sides of the second main electrode, and an initial alignment direction of the liquid crystal molecules is parallel with a direction passing through an interstice between the second end side of the first main electrode and the first line and an interstice between the second end side of the second main electrode and the first line.

2. The liquid crystal display device according to claim 1, wherein
the first counter electrode includes a fourth auxiliary electrode extending from a position in the third main electrode which is lined up with the second end side of the first main electrode toward the second counter electrode, and a fifth auxiliary electrode extending from a position in the fourth main electrode which is lined up with the second end side of the second main electrode toward the second counter electrode, and the second electrode includes a sixth auxiliary electrode extending from a connection portion of the fifth main electrode with the sixth main electrode toward the first counter electrode.

3. The liquid crystal display device according to claim 1, wherein the liquid crystal molecules are in a state of homogeneous alignment or splay alignment when electric field is not generated among the pixel electrode, the first counter electrode and the second counter electrode.

* * * * *